Figure 1:
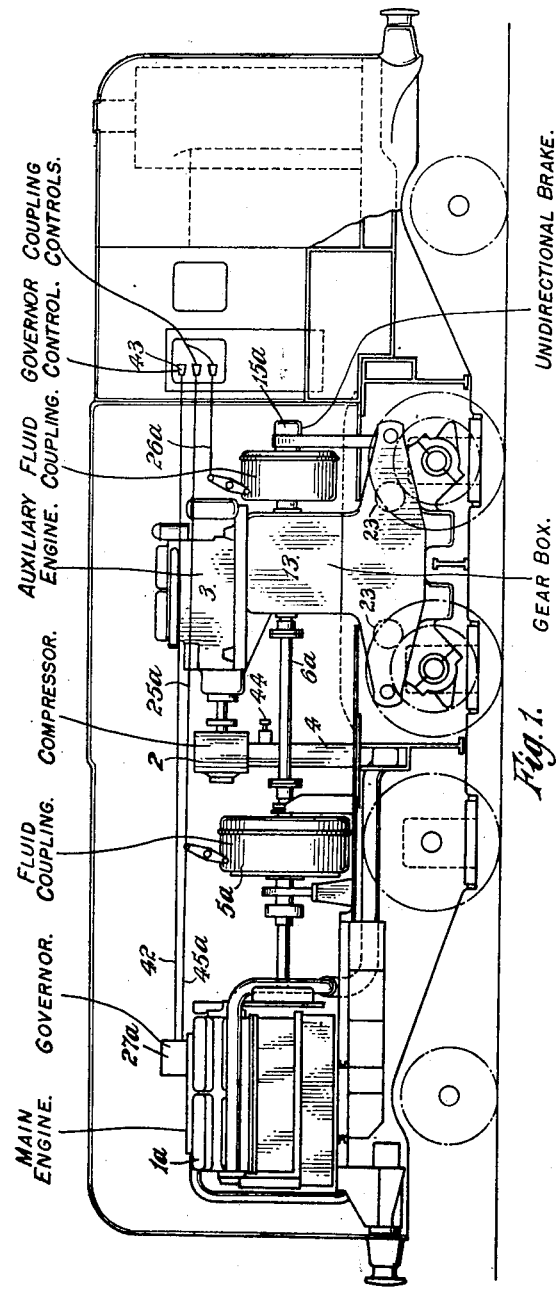

Jan. 29, 1957     L. F. R. FELL ET AL     2,779,213
MULTI-ENGINE POWER PLANT

Filed Jan. 26, 1951     4 Sheets-Sheet 1

INVENTORS
Louis Frederick Rudston Fell
John Ambrose Bennett-Powell
BY
Atty.

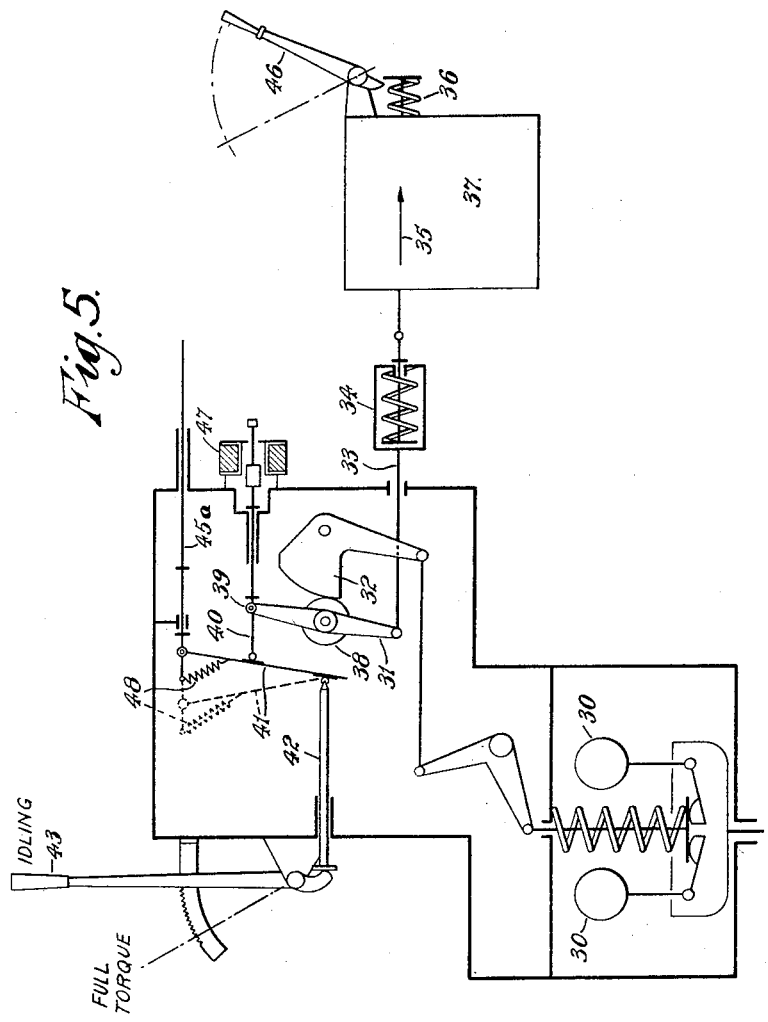

United States Patent Office 2,779,213
Patented Jan. 29, 1957

2,779,213

MULTI-ENGINE POWER PLANT

Louis Frederick Rudston Fell, Littleover, and John Ambrose Bennett-Powell, Colchester, England, assignors to Fell Developments Limited, London, England, a British company Application January 26, 1951, Serial No. 207,899

Claims priority, application Great Britain February 3, 1950

8 Claims. (Cl. 74—675)

This invention relates to power plant which is suitable for driving a mechanism of the kind requiring a driving torque which is at a maximum when starting the mechanism from rest and falls steadily as the speed of the mechanism increases. Examples of this kind of mechanism are self-propelled vehicles for example railway locomotives, and the invention can be used with special advantage for driving such locomotives.

Prime movers are known having an output torque/speed characteristic such that the output torque is zero when the prime mover is at rest, rises to a maximum at the minimum operating speed of the prime mover and thereafter falls steadily as the speed of the prime mover increases. Such prime movers are hereinafter referred to as "prime movers of the kind specified." An example of such a prime mover is a compression-ignition internal combustion engine which is supercharged at a pressure which is at its maximum when the engine is at its minimum operating speed, the engine being provided with a governor controlling its fuel injection to give the torque/speed characteristic described. U. S. patent application No. 569,559 now Patent No. 2,589,788 describes a power unit in which two such engines are connected with the sun wheels of a differential gear through variable filling fluid couplings, the planet carrier of the gear being used to drive a driven mechanism of the kind described, and each sun wheel being associated with a unidirectional device which permits rotation thereof in one direction but not the other. The said specification also describes a power plant comprising two such power units, the planet carrier of each unit being arranged to drive a sun wheel of a further differential gear, the planet carrier of which drives the driven mechanism.

The present invention is an improvement in or a modification of that forming the subject of the said U. S. Patent No. 2,589,788 which enables the power plant to drive the driven mechanism over a greater speed range.

The invention consists in a power plant for driving a mechanism of the kind described above, which comprises at least two prime movers of the kind specified, two primary epicyclic gear trains, each associated with one of the prime movers and comprising first and second input gears connected by one or more planetary gears, means whereby each prime mover drives the first input gear of the epicyclic train associated therewith through a fluid coupling or its equivalent, means whereby each prime mover drives the second input gear of the epicyclic train associated therewith through a variable filling fluid coupling or its equivalent, or through a constantly filled fluid coupling or its equivalent and a clutch, two unidirectional devices associated with each of said primary epicyclic gears one of which is arranged to prevent rotation in one direction of the said second input gear and the other one of which is arranged to prevent rotation in one direction of the planet carrier of the epicyclic gear means for transmitting power from the planet carrier of each primary epicyclic train to one of the input gears of a secondary epicyclic gear train which likewise comprises first and second input gears connected by one or more planetary gears, and means for transmitting power from the planet carrier of the secondary epicyclic train to the driven mechanism. The unidirectional device, which is arranged to prevent rotation in one direction of the planet carrier of each primary epicyclic gear may either act directly on the planet carrier or on any element geared thereto, such as one input gear of the secondary epicyclic gear, or again it may act on the first input gear of each primary epicyclic gear, so that it prevents rotation in one direction of the planet carrier by co-operating with the unidirectional device associated with the second input gear. It will be understood that each epicyclic gear train comprising first and second input gears which are interconnected by one or more planetary gears acts as a differential gear so that the speed of the planet carrier is proportional to the sum of the speeds of the input gears.

It is generally preferable that both the input gears of both the primary epicyclic trains be driven by variable filling fluid couplings, and it will be assumed in what follows that this is the case, although the invention is not limited thereto. Thus, for example, the gears may be driven by constantly filled fluid couplings, provided that in the case of one of them a clutch is interposed between the prime mover and the coupling. Alternatively a torque transmitter equivalent to, that is to say having equivalent transmission characteristics to those of, the fluid coupling may be used, for example a magnetic clutch.

Figure 2:
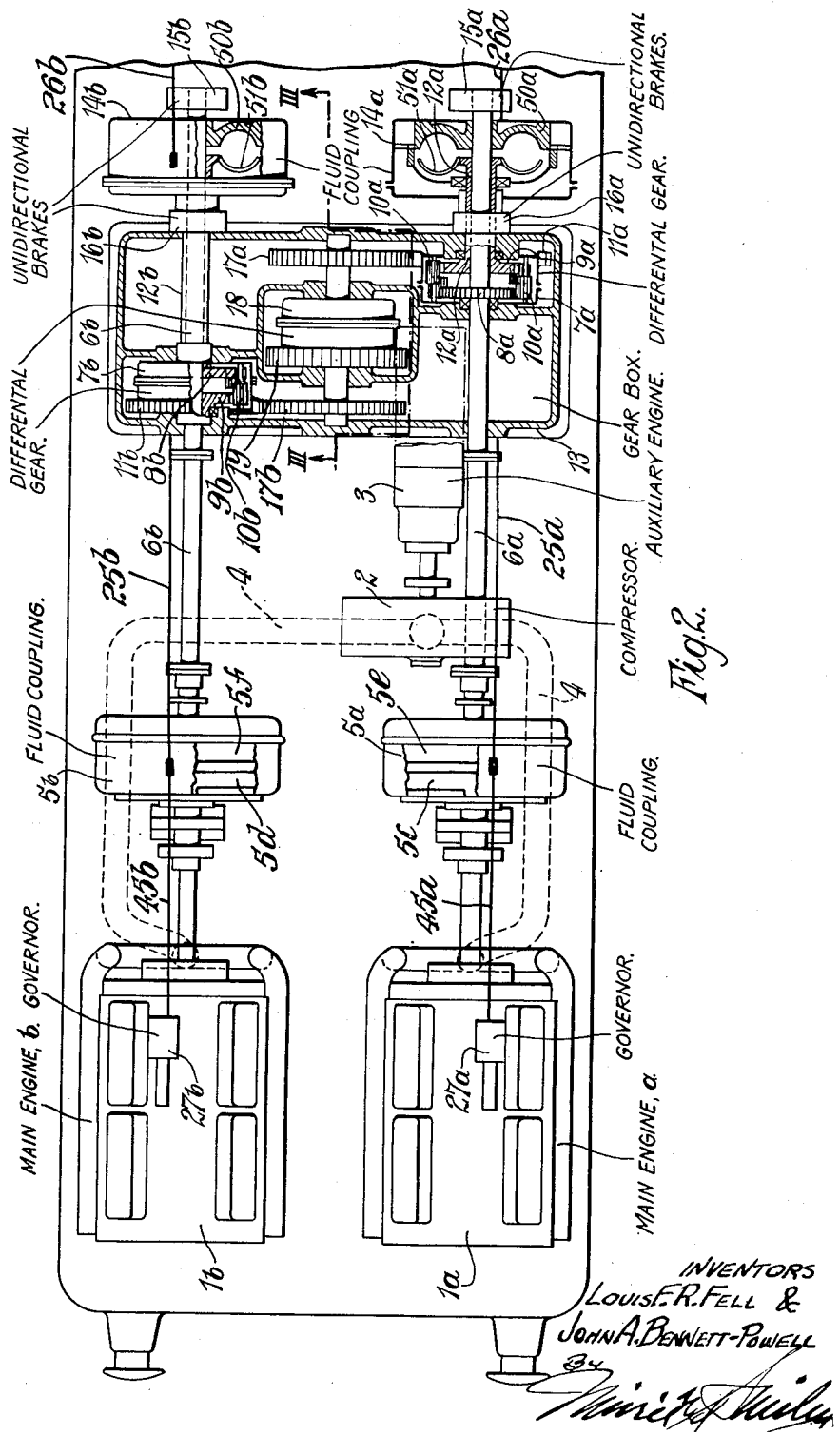

The invention is illustrated by way of example by the accompanying drawings, in which Figure 1 is a diagrammatic side elevation of a railway locomotive driven by a power plant according to the invention, Figure 2 is a plan view, partly in section, showing the layout of the main features of the locomotive together with a section through the gear box.

Figure 3:
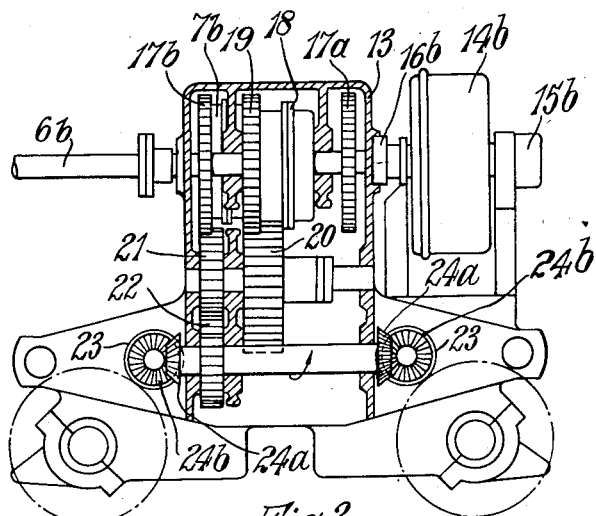
Figure 4:
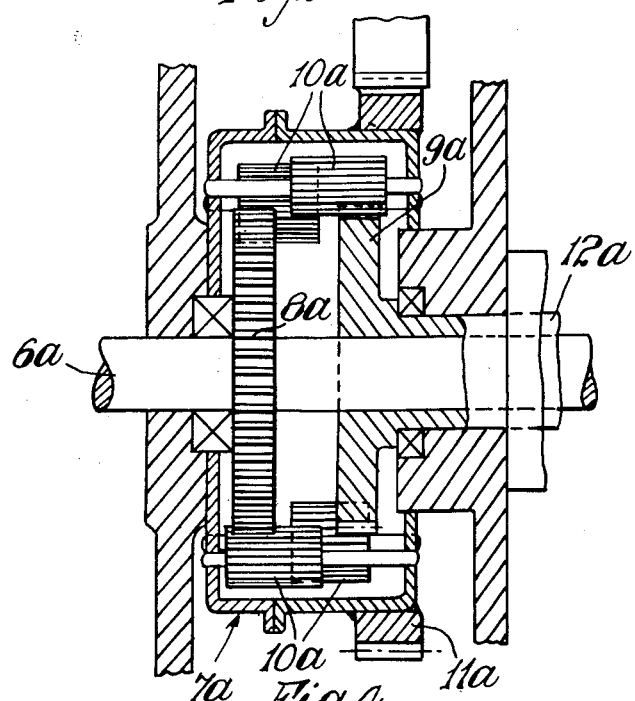

Figure 3 is a sectional view of the gear box corresponding to line III—III of Figure 2, Figure 4 is an enlarged sectional view of one of the differential gears, and Figure 5 is a diagrammatic representation of one of the main engine governors.

The locomotive shown in Figures 1 and 2 of the drawings is driven by a power plant comprising two main compression-ignition internal combustion engines 1a and 1b. These engines are situated side by side and only one of them can be seen in Figure 1 of the drawing. They are supercharged by a blower 2 driven by an auxiliary compression-ignition internal combustion engine 3, the output of the blower being supplied to the engines 1a and 1b by way of piping 4. Each of the main engines 1a, 1b drives the impeller 5c and 5d respectively of a variable filling fluid coupling 5a or 5b of the known scoop-controlled type. The scoops of the couplings 5a and 5b are separately controlled from the cab of the locomotive by rods 25a and 25b respectively. The respective runners 5d and 5e of these couplings respectively drive, by way of shafts 6a and 6b, the sun wheels or first input gears 8a and 8b of identical primary differential gears 7a and 7b in a gear box 13 and having output gears 11a and 11b. The gears 7a and 7b are shown in section in Figure 4 and comprise in addition to the sun wheels or first input gears 8a and 8b, sun wheels or second input gears 9a and 9b and planet wheels 10a and 10b which are mounted in casings or planet carriers having gear teeth 11a and 11b respectively.

The differential gears 7a and 7b have second input shafts 12a and 12b which are in the form of sleeves mounted on extensions of the shafts 6a and 6b passing through the gear box 13 which houses the differential gears 7a and 7b. The sleeve shafts 12a and 12b are coupled to the second input sun gear wheels 9a and 9b of the respective differential gear boxes 7a and 7b. In addition the shafts 12a and 12b are driven respectively from the extensions of the shafts 6a and 6b by means of variable filling couplings 14a and 14b. The couplings 14a and 14b are identical; coupling 14a being shown in section and coupling 14b being shown with parts broken away in Figure 2. It will be seen that shafts 6a and 6b drive the coupling impellers 50a and 50b respectively, while the coupling runners 51a and 51b respectively are fixed to and drive the sleeve shafts 12a and 12b. The fluid couplings 14a and 14b are likewise of the scoop-controlled type, but each need only be sufficiently large to transmit half the torque of the main engine 1a or 1b respectively associated therewith. The scoops of the couplings 14a and 14b are separately controlled from the cab by rods 26a and 26b.

Mounted on each of the shafts 6a and 6b is a unidirectional device 15a or 15b of known kind, for example a self-sliding synchro coupling, which will permit the shaft to rotate in one direction but not in the other. Similar unidirectional devices 16a and 16b respectively are mounted on the sleeve shafts 12a and 12b.

The gear teeth 11a and 11b of the primary differential gear casings mesh with pinions 17a and 17b on which are mounted the sun wheels of secondary differential gear 18, which is identical with the primary differential gears and is also housed in the gear box 13. The casing of the gear 18 is provided with gear teeth 19 which forms the output gear which drives the wheels of the locomotive by way of a gear train comprising pinion gears 20, 21, 22 and 23 and bevel gears 24 and 25. This gear train includes a reversing mechanism which may be of known kind and is not shown herein.

Each of the main engines is provided with a governor 27a and 27b respectively. These governors, 27a of which is shown in Figure 5 are identical and are fully described in U. S. patent application No. 109,635, now Patent No. 2,600,983 and will not be described herein in further detail than is necessary for an understanding of the power plant now being described. As shown in Figure 5, the governors 27a and 27b comprise flyweights 30 which actuates a lever 31 by way of a linkage and a cam 32. The lower end of the lever 31 is pivotally connected to a rod 33 which is connected with the fuel control rack of the fuel injection pump 37 through an extensible link 34. Movement of the rod 33 in the direction of the arrow 35 has the effect of reducing the fuel injection to the engine, and the rod is urged in this direction by a spring 36. The lever 31 is provided at its centre with a cam roller 38 and is pivotally connected at its upper end at 39 to a rod 40. One end of the rod 40 which in governor 27a abuts against a lever 41, which is pivotally connected at its upper end to a rod 45a, and its lower end abuts against a rod 42, the other end of which is actuated by a regulator lever 43 in the cab of the locomotive. The lever 43 is common to both main engine governors, that is to say it is arranged to actuate simultaneously the rods 42 of both governors.

The end of the rod 45a remote from the lever 41 is linked to the rod 25a which controls the scoop of the fluid coupling 5a driven by the main engine 1a, the arrangement being such that when the coupling is emptied, the rod 45a moves to the left from the full line to the broken line position shown in Figure 5, sufficiently far to restrict the fuel injection of that main engine to the idling charge. When, however, the coupling is filled, the rod 45a moves to the full line position shown in Figure 5 at which it no longer restricts the fuel injection. It will be understood that while the interlock between the lever 41 and the coupling 5a is shown for simplicity as being mechanical, other means may be used for example the vacuum connection shown in the aforementioned U. S. Patent No. 2,600,983. The governor 27a is provided with a solenoid 47a which is energised with the starting motor of the engine 1a so as to pull the lever 31 in a clockwise direction to increase the fuel injection to the value required for starting. Each of the governors 27a and 27b is further provided with a stopping lever 46 which, with the aid of the link 34, can be used to stop the engine regardless of the position of the lever 31.

The auxiliary engine 3 (Figure 1) is provided with a governor of known kind (not shown) which governs the engine to a constant speed. This speed is so selected that the blower 2 can deliver air to the main engines 1a and 1b at a maximum supercharging pressure until, but only until, the speed of these engines reaches a predetermined value. At main engine speeds higher than that value, the supercharging pressure falls steadily, while at speeds lower than that value the supercharging pressure is maintained constant by means of a blow-off valve 44. The profile of the cam 32 is such that, with the supercharging arrangements as stated, the torque of the main engine 1a is at a maximum at the minimum operating speed, for example 200 R. P. M. and thereafter falls steadily as its speed increases. The governor thus serves to keep the torque of the engine on a predetermined torque/speed curve. The function of the regulator lever 43 is to shift the fulcrum 39 of the lever 31 so as to control the zero setting of the governor 27a and hence the line of zero torque with respect to which the torque/speed curve is to be regarded as plotted. This control is effected by the regulator 43 simultaneously for the governors 27a and 27b of both the main engines 1a and 1b.

The operation of the power plant will now be described by reference to the procedure for driving the locomotive from rest. The main engines 1a and 1b are first started and allowed to idle. The regulator lever 43 is then moved from the position shown in Figure 5 to a position at or near the position marked "full torque," whereupon the scoop control of one of the fluid couplings for example 5a, is operated to fill that coupling and at the same time, via the rod 45a, to permit engine 1a to receive the full amount of fuel determined by the position of the regulator 43 and the speed of the engine 1a. This raises the torque of the engine 1a to a value at or near its maximum, which is sufficient to start the locomotive at the speed reduction ratio of 4:1 determined by the primary differential gear 7a and secondary differential gear 18 through which the torque is transmitted to the locomotive wheels, it being remembered that the first and second input gears 8b and 9b of the differential gear 7b and the second input gear 9a of the differential gear 7a respectively are prevented from backward rotation by the unidirectional devices 15b, 16a and 16b. The unidirectional devices 15b and 16b associated with the input gears of the differential gear 7b thus co-operate to prevent rotation in one direction of the casing or planet carrier 11b. Engine 1a now accelerates the locomotive at constant torque while the slip in fluid coupling 5a decreases. When this slip has reached a suitable value, the scoop control of coupling 5b is operated to fill this coupling and allow the fuel injection of engine 1b to reach a value which raises the torque of that engine to a value at or near its maximum. The engine 1b then begins to drive the sun wheel 8b, thereby reducing the speed reduction ratio at which the engines 1a and 1b drive the locomotive to 2:1. The locomotive now accelerates at constant torque until the slip in both couplings 5a and 5b has fallen to a steady value, whereupon the locomotive and both engines 1a and 1b accelerate together with decreasing torque.

When the locomotive reaches a speed approaching that at which the main engines 1a and 1b can no longer accelerate it, which may, for example, be of the order of 30-40 M. P. H., the scoop controls of the fluid couplings 14a and 14b are operated to fill these couplings. This has the effect of dividing the torque of engine 1a between sun wheels 8a and 9a of the differential gear 7a and of engine 1b between sun wheels 8b and 9b of the differential gear 7b, so that the speed ratio becomes 1:1. The speed of each engine 1a and 1b therefore drops and its governed torque rises by a corresponding amount. The engines can then continue to accelerate the locomotive, under the control of the regulator 43, until the engine speeds reach a value approaching their maximum rated speeds. The predetermined locomotive speed at which the indirectly driven fluid couplings 14a and 14b are filled is preferably just above that which corresponds with the engine speed giving maximum torque. There is thus an adequate reserve of tractive effort available when the speed ratio is increased, without thereby causing excessive slipping of the fluid couplings.

If desired, the scoop controls of the fluid couplings 14a and 14b may be actuated separately or together by an automatic control actuated in dependence on the speed of the locomotive or engines 1a and 1b.

Instead of the arrangement of coaxial shafts shown for driving the impellers of the fluid couplings 14a and 14b, these may be situated on an axis displaced from those of the couplings 5a and 5b and driven through a spur or chain gear.

It will be understood that two or more locomotives each driven by a power plant according to the invention may be coupled in tandem in order to obtain a desired tractive effect/speed relationship.

We claim:

1. A power plant for driving a mechanism of the kind requiring a driving torque which is at a maximum when starting the mechanism from rest and falls steadily as the speed of the mechanism increases, which power plant comprises at least two prime movers having power output shafts, two primary differential gear trains each associated respectively with one of the prime movers and each including two input gears and an output gear, a fluid coupling respectively connecting each prime mover output shaft to one input gear of the respective differential gear train, a variable filling fluid coupling respectively connecting each prime mover output shaft to the other input gear of the respective differential gear train, unidirectional brake means operatively connected with each of said input gears in each of said differential gear trains to allow rotation thereof in one direction only, and means interconnecting said output gears and the mechanism to be driven for transmitting power from the output gears of said primary differential gear trains to the mechanism to be driven.

2. A power plant as set forth in claim 1 wherein said means for transmitting power comprises a secondary differential gear train including an output gear connected with the mechanism to be driven and two input gears respectively connected with the output gears of said primary differential gear trains.

3. A power plant as set forth in claim 2 wherein said first-mentioned fluid coupling is a variable filling fluid coupling.

4. A power plant for driving a mechanism of the kind requiring a driving torque which is at a maximum when starting the mechanism from rest and falls steadily as the speed of the mechanism increases, which power plant comprises at least two prime movers having power output shafts, two primary differential gear trains each associated respectively with one of the prime movers and each including two input gears and an output gear, a fluid coupling respectively connecting each prime mover output shaft to one input gear of the respective differential gear train, a variable filling fluid coupling respectively connecting each prime mover otput shaft to the other input gear of the respective differential gear train, a unidirectional brake operatively connected with each of said input gears to allow rotation thereof in one direction only, and a secondary differential gear train including an output gear connected with the mechanism to be driven and two input gears respectively connected with the output gears of said primary differential gear trains.

5. A power plant as set forth in claim 4 wherein said variable filling fluid coupling is drivingly connected with the respective prime mover through the respective first-mentioned fluid coupling.

6. A power plant as set forth in claim 5 wherein said first-mentioned fluid coupling is a variable filling fluid coupling.

7. A power plant for driving a mechanism of the kind requiring a driving torque which is at a maximum when starting the mechanism from rest and falls steadily as the speed of the mechanism increases, which power plant comprises at least two prime movers having power output shafts, two primary differential gear trains each associated with one of the prime movers and each including two input gears and an output gear, a first fluid coupling having an impeller coupled respectively to each prime mover output shaft and having a drive shaft attached to one input gear of the respective differential gear train, a variable filling second fluid coupling having an impeller connected respectively to the drive shaft of each of said first fluid couplings and having a drive shaft, a sleeve shaft journalled on the said drive shaft of said first fluid coupling and fixed to the other input gear of the respective differential gear train and to the drive shaft of said second coupling, unidirectional brakes operatively connected with each drive shaft and each sleeve shaft to allow rotation of said input gears in one direction only, and a secondary differential gear train including an output gear connected with the mechanism to be driven and two input gears respectively connected with the output gears of said primary differential gear trains.

8. A power plant for driving a mechanism of the kind requiring a driving torque which is at a maximum when starting the mechanism from rest and falls steadily as the speed of the mechanism increases, which power plant comprises at least two prime movers having power output shafts, two primary differential gear trains each associated respectively with one of the prime movers and each including two sun wheels and a planet carrier, a variable filling first fluid coupling having an impeller connected respectively to the power output shaft of each prime mover and having a drive shaft connected to one sun wheel of the respective differential gear train, a variable filling fluid coupling having an impeller connected respectively to the drive shaft of each first mentioned fluid coupling and a driven shaft, a sleeve shaft journalled on said drive shaft of said first fluid coupling and to said driven shaft and connected to the other sun wheel of the respective differential gear train, a unidirectional device operatively connected with each of said sun wheels to allow rotation thereof in one direction only, and a secondary differential gear train including a planet carrier connected to the mechanism to be driven and the two sun wheels respectively connected with the planet carriers of said primary differential gear trains.

References Cited in the file of this patent

UNITED STATES PATENTS

| Number | Name | Date |
|---|---|---|
| 1,076,632 | Gammeter | Oct. 21, 1913 |
| 1,710,962 | Banner | Apr. 30, 1929 |
| 1,868,130 | Bauer et al. | July 19, 1932 |
| 1,953,486 | Kiep | Apr. 3, 1934 |
| 2,283,431 | Gasser | May 19, 1942 |
| 2,300,977 | Schlaepfer | Nov. 3, 1942 |
| 2,403,398 | Reggio | July 2, 1946 |
| 2,589,788 | Fell | Mar. 18, 1952 |
| 2,619,800 | Fell | Dec. 2, 1952 |